United States Patent

Cook

[15] 3,685,092
[45] Aug. 22, 1972

[54] COOKING VESSEL WITH DETACHABLE HANDLE

[72] Inventor: Billy G. Cook, Booneville, Ark.
[73] Assignee: General Electric Company
[22] Filed: March 11, 1971
[21] Appl. No.: 123,352

[52] U.S. Cl. ................................................. 16/114
[51] Int. Cl. ............................................ A47b 95/02
[58] Field of Search ................ 16/114, 114 A; 220/94

[56] References Cited

UNITED STATES PATENTS

| | | | |
|---|---|---|---|
| 2,368,297 | 1/1945 | Hanke | 16/114 A |
| 2,621,357 | 12/1952 | Stuman | 16/114 A |
| 3,215,063 | 11/1965 | Olson | 99/425 |

*Primary Examiner*—Bobby R. Gay
*Assistant Examiner*—Doris L. Troutman
*Attorney*—Lawrence R. Kempton, Leonard J. Platt, John F. Cullen, Frank L. Neuhauser, Oscar B. Waddell and Joseph B. Forman

[57] ABSTRACT

The invention is directed to a cooking vessel of the electric skillet type with a detachable handle structure that secures to the cooking vessel by a single stud on the vessel and that can be easily detached by a failsafe release means whereby the handle structure may be conveniently removed for immersion of the cooking vessel or skillet in water for washing.

7 Claims, 6 Drawing Figures

PATENTED AUG 22 1972 3,685,092

INVENTOR
Billy G. Cook
BY John F. Cullen
ATTORNEY.

INVENTOR.
Billy G. Cook
BY John F. Cullen
ATTORNEY.

3,685,092

COOKING VESSEL WITH DETACHABLE HANDLE

BACKGROUND OF THE INVENTION

1. Field of the Invention

The invention is directed to a cooking vessel of the electric skillet type having detachable handle structure which is secured to the skillet by a single stud, the handle providing both supporting legs and means to support the vessel and being easily removable in a single motion whereby the vessel may be readily washed.

2. Description of the Prior Art

It has become common in the small appliance field to provide an electric appliance or cooking vessel with a removable control member attached to an electric cord to avoid the need for individual controlling of each appliance. This control member is a device that is attached to the cooking vessel to supply electric current for heating and also to regulate the temperature of the vessel. The control member can be removed whereby the vessel may be immersed in the sink for washing. In the larger cooking vessels such as an electric skillet, it has become customary to provide opposing handles of the so-called buffet type as opposed to the prior stick handle type which used a single handle. The buffet type handles present a more pleasing appearance and make the appliance more easy to store when not in use. Generally, the appliance is large enough that the handles present obstacles when it is desired to wash the skillet. The skillets that have detachable handles are complex and include permanent structure afixed to the cooking vessel which approaches the size of the handle itself still leaving an awkward container to wash even after the handles are removed. Then, of course, many of the buffet-type cooking vessels or skillets simply do not provide any means of removal of the attached supporting handle structure so that the entire vessel must be immersed with its awkward projecting supporting structure.

SUMMARY OF THE INVENTION

Briefly described, the invention is directed to a cooking vessel with an improved detachable handle structure. The structure is primarily intended for but is not limited to the electric skillet cooking vessel and is so described. It consists of the improvement in a detachable handle structure which uses a single tubular-like stud extending from a side wall of the cooking vessel and the stud is provided with an overhanging flat washer-like outer end. A plastic formed handle is provided and has its inner surface lying along the side wall of the skillet. The handle has integral Y-shaped spaced support extensions and legs on each end of the handle and these are located equidistant from the centrally disposed stud. A flexible sheet metal plate latching means is made flexible by securing it to a cantilever support to the inner surface of the handle and the plate is provided with an aperture whereby the plate and handle are slideable upwardly along the side wall of the vessel to cam the flexible plate and permit the aperture to straddle and lock on the overhanging outer washer end of the stud. Means are provided on the handle to guide the stud into the locking position on the latch whereby the handle extensions contact and support the vessel side and bottom walls to secure the handle firmly on the single stud. A release means is secured to the latch plate and extends beyond the handle's outer surface whereby it can be actuated by the user's thumb. The release means is connected to move downward toward the legs and bend the latch plate away from the vessel side wall and stud and thus release the handle from the vessel. Thus, the main object of the invention is to provide an easily detachable handle structure that requires only a single stud on the skillet body and that is easily and firmly secured to the single stud and is removable by a downward motion in a fail-safe direction whereby the handle may be detached from each side of the skillet to render the skillet easily washable.

DESCRIPTION OF THE PREFERRED EMBODIMENT

While the invention can be applied to any cooking vessel, it is particularly applicable to the electrically-controlled cooking vessel or electric skillet of the buffet-handle type wherein a pair of oppositely disposed handles are provided and the invention will be described in connection therewith.

Figure 1:
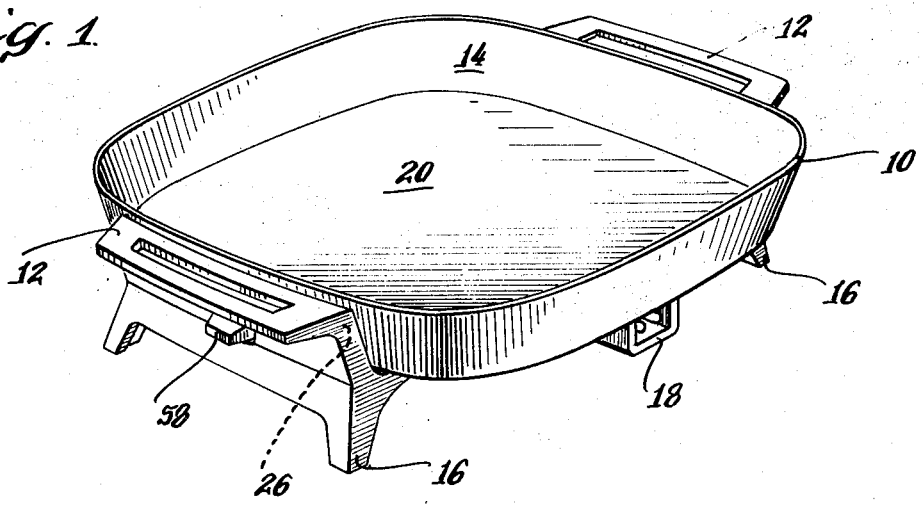
FIG. 1 is a perspective view of an electric cooking appliance showing handle structure of the buffet-type.

Referring to FIG. 1, there is shown an electric cooking appliance comprising a vessel 10 with a pair of heat resistant formed plastic handles 12 that may extend from any two opposite side walls 14 as shown. The vessel is supported by legs 16 in the normal manner. In order to supply current there is provided, generally at one side in the bottom of the vessel, a terminal portion 18 having electrical terminals connected to interior heating elements in a known manner. These terminals are designed to capture a removable probe control, now shown, and which serves as the source of electric current to heat the bottom wall 20 of the vessel in a well-known manner.

In the modern version electric skillet, the old stick handle has been dispensed with and replaced by buffet handles that are disposed on opposite sides of the cooking vessel as shown to present a more pleasing appearance and permit easier storage. Such cooking vessels present problems when immersed for washing because of the protrusions of the handles and leg structure and the generally large size of the vessel. To overcome this, the present invention provides detachable handles to leave a substantially clean cooking vessel for easy washing. It is also important that the handles be easily and snugly attached to the cooking vessel to firmly hold and support it and be fail-safe so they cannot become detached when the vessel is lifted.

Figure 2:
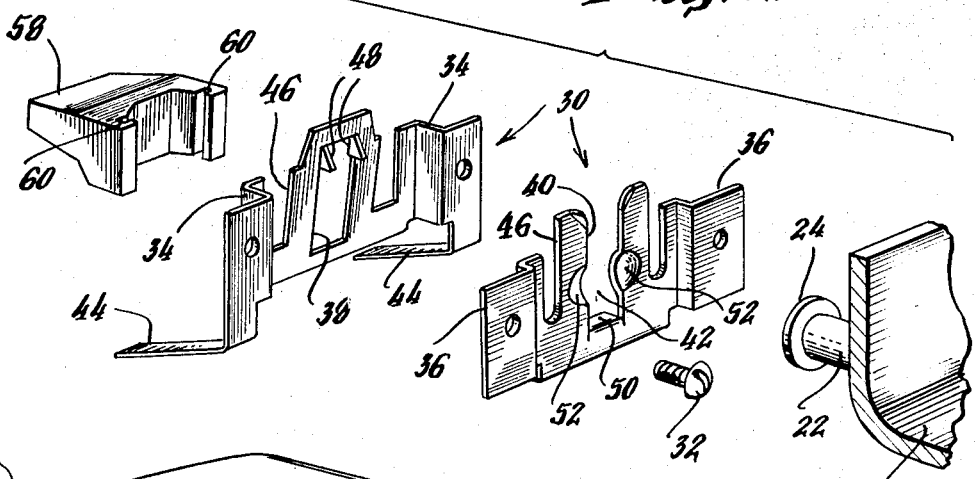
FIG. 2 is an exploded perspective view of the latch structure for a handle.
Figure 3:
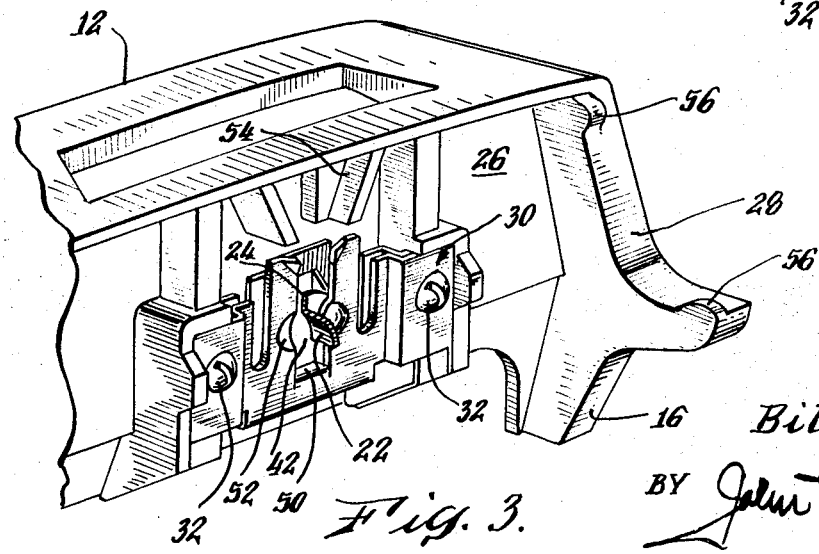
FIG. 3 is a partial perspective showing the latch structure on the inner surface of a single handle.
Figure 4:
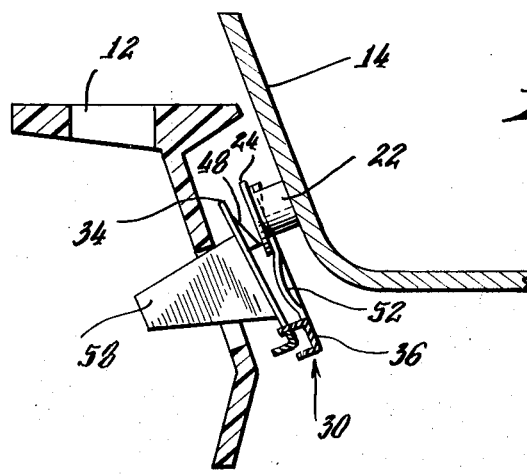
FIG. 4 is a partial cross-sectional view showing the latch structure moving into latching or locking position on the stud.
Figure 5:
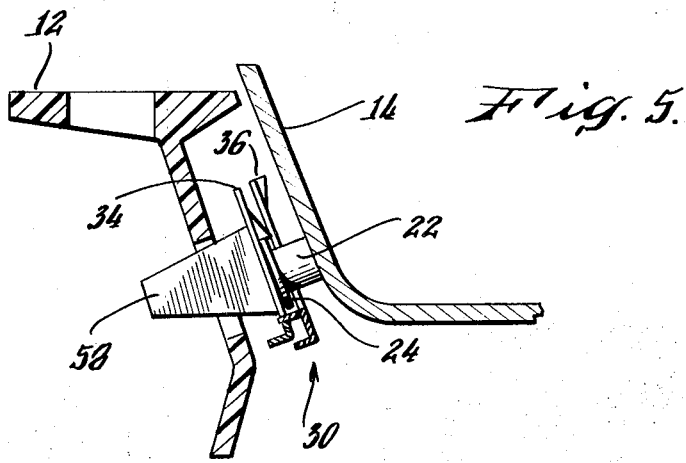
FIG. 5 is a view, similar to FIG. 4, showing the handle in the locked or latched position on the stud.

Referring to FIGS. 2 and 3, a detachable handle structure is shown as it would be applied to a single tubular-like (i.e. solid, hollow, and a cross-section) stud on the side wall 14 of the vessel. A single handle structure will be described and it is repeated on each side of the vessel. To support the handle, a single tubular stud 22 is secured as by welding to extend from the side wall 14 of the vessel and this stud is provided with an enlarged or overhanging flat washer-like outer end 24 that may be separately attached to the stud or formed therewith or may comprise a simple washer welded to the outer end of the stud. This is the only structure extending from the vessel in connection with the handle supported thereon. In order to support the handle 12 on the single stud 22, as seen in FIG. 3, the handle may be formed of a plastic to have its inner surface 26 generally lying along side wall 14 and having integral Y-shaped spaced support extensions 28 and legs 16 formed on each end of the handle as shown in FIG. 1. For balanced skillet support, the Y-shape support piece is formed on each end of the handle equidistant from the centrally disposed stud 22. In other words, stud 22 will latch with the handle midway between the end extensions. To secure the handle to the stud 22, there is provided a flexible plate latch means generally indicated at 30 and this is secured to the inner surface 26 of the handle by suitable means such as screws 32. As shown in FIG. 2, the latch means 30 may be formed of two distinct sheet metal stamped parts comprising members 34 and 36 which, when secured to the handle as shown in FIG. 3, form the latch plate 30. Members 34 and 36 are formed with matching apertures 38 and 40 which, when slid together as shown in FIG. 3 provide the plate with an aperture 42 and so formed that, when the handle 12 is slid upwardly from the bottom of vessel 10 parallel and along the side wall 14, the two members 34 and 36 are cammed apart and then spring together to permit aperture 42 to straddle and lock on the overhanging outer end 24 of the stud. This flexibility is obtained by providing member 34 of latch means 30 with supporting pieces 44 that lie along a suitable surface on the handle and permit the entire latch structure 30 to be cantilever supported on the handle. This cantilever support is enhanced by suitable slots 46 cut into members 34 and 36 to provide for easy bending of the latch means 30. The camming action is obtained by the enlarged end 24 contacting camming surfaces 48 on a pair of ears formed in member 34 as shown in FIG. 2. Thus, as enlarged end 24 enters the latch structure from the top between members 34 and 36, it cams the latch plate 30 by contact with cam surfaces 48 whereby the enlarged end 24 forces its way between members 34 and 36 which then snap together and permit the aperture 42 to lock on the overhanging end 24 as seen in FIG. 3. The latch also has a bottom ear 50 or other suitable means to limit the downward motion of end 24 with respect to the latch structure. Similarly, suitable dimples 52 may be provided to tighten up on the latch structure and provide a firm grip by the latch 30 on outer end 24. This action is shown in FIGS. 4 and 5. FIG. 4 shows the outer end 24 having just cammed off surface 48 to bend member 34 of latch 30 with 24 entering the aperture and members 34 and 36 being separated. FIG. 5 then shows the stud in the locked or latched position in latch 30 whereby members 34 and 36 have now closed to form aperture 42 straddling and locking on end 24. In order to ensure that the latch and stud match and fit one another, a suitable guide means 54 is provided on the handle 12. This guide means may simply be formed plastic in a cone guide as shown in FIG. 3 whereby enlarged end 24 easily fits in the guide and is directed or guided into aperture 42 for locking therein. The locking occurs when the extensions 28 contact and support the walls 20 and 14 on each side of the stud. The extensions 28 may support directly or, to reduce heat transfer to the handle portion, may use small protrusions 56 to reduce the contact area if desired. In either case, once the stud end 24 is firmly latched in latch means 30, the extensions 28 grasp the walls of the vessel to provide a firm non-springy support on legs 16 and this entire support is through the single stud 22 on the vessel.

In order to detach the legs, a suitable release means 58 is shown in FIG. 2. This comprises a plastic knob that is secured by any suitable means, such as grooves 60 grasping the edges of slot 46 in member 34, to the latch plate 30. By connecting in this manner, it can be seen in FIG. 2, that release means 58 must be pushed downward toward the legs 16 in order to bend member 34 of latch plate 30 away from member 36 and allow end 24 on the stud to clear the ears containing cam surface 48 and thus separate itself from the aperture 42. This downward motion of release means 58 is desired in order to provide a fail-safe arrangement. Thus, as shown in FIG. 1, the release means extends beyond the outer surface of handle 12 where it can be actuated by the user's thumb pressing in a downward direction whereupon the vessel may then be lifted out of the handle latching structure. Further, even if the handle were unlatched, the vessel cannot be dropped because it must be lifted from the handle to separate the two. Thus, the device is fail-safe with respect to latch operation and normal skillet handling can be accomplished without dropping the skillet even if the latching structure should be unlatched.

Figure 6:
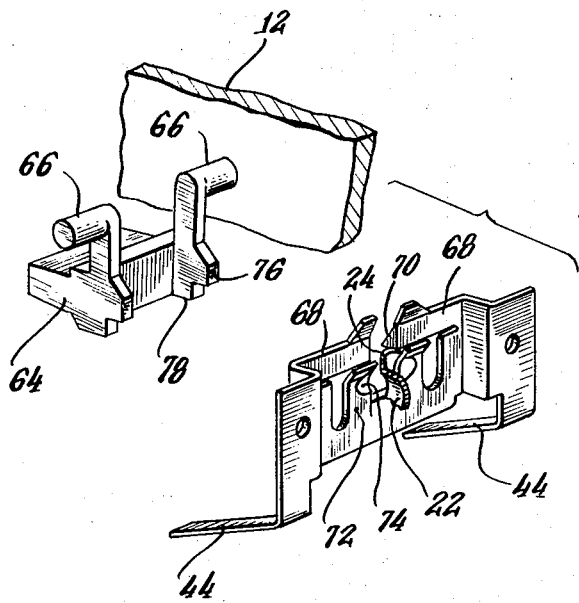
FIG. 6 is a perspective view of a modified latch structure similar to FIG. 2.

While the preferred arrangement has been shown using members 34 and 36, it is possible to replace the two parts with a single part as shown in FIG. 6 wherein a single suitably formed latch plate 62 is provided with essentially the same structure in a single stamping. Thus, a suitably formed release member 64 may be pivoted from each side at 66 in handle 12. The latch plate 62 is supported in the handle by legs 44 as previously described. However, the latch, while operating the same is somewhat differently formed by having bendable fingers 68 having ears with cam surfaces 70 thereon as before. Similarly, fingers 72 are formed with dimples 74 therein to provide a spring clamping force and the outer end 24 of the stud then bends fingers 68 as it slides along cam surfaces 70 to drop in the aperture whereupon fingers 68 snap back and lock outer end 24 in the aperture as before. To detach, release means 64 is pivoted downwardly or counterclockwise whereupon projections 76 bend fingers 68 away from locking on end member 24 and this is followed shortly by projections 78 contacting fingers 72 to release the spring pressure caused by dimples 74 whereupon the entire handle is easily slid downward parallel to the wall of the skillet or vessel body and free from the skillet. FIG. 6 merely represents another version of the same concept of the single stud support as previously described in connection with the preferred embodiment.

Thus, it will be apparent that the detachable handle structure provides both vessel body supporting means and the legs of the appliance and is fail-safe in operation in that the normal skillet handling can be accomplished with the handles installed, even if unlatched, without dropping the skillet. Additionally, the support is firm with no springiness and the handles are held snugly to the skillet by a single stud on the vessel body. The single stud thus reduces the size of the skillet body and permits easy washing when the handles are detached. The parts are generally of simply formed sheet metal or plastic and are inexpensive and easily manufactured and assembled.

While there have been described preferred forms of the invention, obvious equivalent variations are possible in light of the above teachings. It is therefore to be understood that within the scope of the appended claims the invention may be practised, otherwise then as specifically described, and the claims are intended to cover such equivalent variations.

What is claimed is:

1. In a cooking vessel with bottom and side walls, an improved detachable handle comprising,
    a single stud with an enlarged washer-like outer and extending from a side wall,
    a handle with an inner surface having spaced extensions and supporting legs equidistant from the stud on each side with the extensions supporting said walls,
    flexible plate latch means secured to said handle inner surface and slidable parallel to said side wall to completely straddle and lock on said enlarged end,
    means on said handle to guide the stud into locking position on said latch and secure said handle by said single stud, and
    release means secured to said plate and extending beyond the handle outer surface to bend said plate and detach said latch from the stud for handle removal.

2. Apparatus as described in claim 1 wherein said latch means is cantilever-supported for bending away from the side wall and stud on actuation of said release means.

3. Apparatus as described in claim 2 wherein said release means is connected to move downward toward said legs to detach said latch.

4. In an electrically-controlled cooking vessel with bottom and side walls and oppositely disposed handles thereon, the improvement in detachable handle structure comprising,
    a single tubular stud extending from a side wall and having an overhanging flat washer-like outer end,
    a plastic formed handle having its inner surface lying along a side wall and having integral Y-shaped spaced support extensions and legs on each end thereof equidistant from the centrally disposed stud,
    flexible plate latch means secured to said inner surface,
        said plate having an aperture and being slidable with the handle upwardly along the side wall camming said plate to permit said aperture to straddle and lock on said overhanging end,
    means on said handle to guide said stud into locking position on said latch when the extensions contact and support the walls to secure the handle by said single stud, and
    release means secured to said plate to bend said plate and detach the latch for handle removal.

5. Apparatus as described in claim 4 wherein said flexible plate is sheet metal and cantilever-supported for bending away from the side wall and stud on actuation of said release means.

6. Apparatus as described in claim 5 wherein said release means extends beyond the handle outer surface for thumb actuation.

7. Apparatus as described in claim 6 wherein said release means is connected to move downward toward said legs to detach said latch.

* * * * *